US009253539B2

(12) United States Patent
Ashbrook et al.

(10) Patent No.: US 9,253,539 B2
(45) Date of Patent: Feb. 2, 2016

(54) SYSTEMS AND METHODS FOR SETTINGS MANAGEMENT ACROSS MULTIPLE TITLES

(75) Inventors: Jeffrey R. Ashbrook, North Hollywood, CA (US); Kyle Prestenback, Los Angeles, CA (US); Brian Ikei, Toluca Lake, CA (US)

(73) Assignee: Disney Enterprises, Inc., Burbank, CA (US)

( * ) Notice: Subject to any disclaimer, the term of this patent is extended or adjusted under 35 U.S.C. 154(b) by 362 days.

(21) Appl. No.: 12/895,144

(22) Filed: Sep. 30, 2010

(65) Prior Publication Data

US 2012/0082434 A1 Apr. 5, 2012

(51) Int. Cl.
*H04N 9/80* (2006.01)
*H04N 21/485* (2011.01)
*H04N 21/426* (2011.01)
*H04N 21/432* (2011.01)
*H04N 21/475* (2011.01)

(52) U.S. Cl.
CPC ..... *H04N 21/4852* (2013.01); *H04N 21/42646* (2013.01); *H04N 21/4325* (2013.01); *H04N 21/4751* (2013.01); *H04N 21/4854* (2013.01)

(58) Field of Classification Search
USPC .................................. 386/239–262, 353–357
See application file for complete search history.

(56) References Cited

U.S. PATENT DOCUMENTS

| 6,181,870 B1* | 1/2001 | Okada et al. ................... 386/241 |
| 6,441,811 B1* | 8/2002 | Sawada et al. ................. 345/204 |
| 2004/0179810 A1* | 9/2004 | Haussmann et al. ............ 386/46 |
| 2007/0031122 A1* | 2/2007 | Yamagata et al. .............. 386/95 |
| 2007/0147786 A1* | 6/2007 | Togashi et al. ................. 386/96 |
| 2010/0057629 A1* | 3/2010 | Markowitz .................... 705/310 |
| 2011/0188833 A1* | 8/2011 | Kawato et al. ................ 386/241 |

* cited by examiner

*Primary Examiner* — Hung Dang
(74) *Attorney, Agent, or Firm* — Ference & Associates LLC

(57) ABSTRACT

Systems and associated methods for managing application settings across titles are described. A settings management application allows for setting, saving and accessing preferences for one or more applications. Users can manage their application settings as desired and once saved, these application settings can be accessed repeatedly, even upon loading of a new title/disc into the media player.

20 Claims, 11 Drawing Sheets

SYSTEMS AND METHODS FOR SETTINGS MANAGEMENT ACROSS MULTIPLE TITLES

BACKGROUND

Media players, such as optical and magneto-optical disc players (DVD players or BLU-RAY DISC players), are popular for viewing audio-visual content such as movies, games and the like. Most modern players access media content stored on a multi-media disc via an optical drive. Newer formats for discs, such as the BLU-RAY DISC, provide an optical disc storage medium designed to supersede the standard DVD format and have a large storage capability, such as suitable for storing high-definition (HD) video content and other data. The BLU-RAY DISC typically provides up to 25 GB per single-layer disc, and 50 GB per dual-layer disc. These figures represent standard storage, however, and the BLU-RAY specification is open-ended. BLU-RAY DISC is a registered trademark of BLU-RAY DISC ASSOCIATION in the United States and other countries.

SUMMARY OF THE INVENTION

Embodiments provide systems and associated methods configured for allowing users to manage application settings across titles. Embodiments provide a settings management application for setting, saving and accessing preferences for one or more applications. Users can manage their application settings as desired and once saved, these application settings can be accessed repeatedly, even upon loading of a new title (multi-media disc) into the media player.

In summary, one aspect provides a method for managing application settings across titles comprising: responsive to input of a multi-media disc to an optical drive of a media player, ascertaining if one or more application settings files reside in media player memory, the one or more application settings files storing one or more preferred default values for one or more applications that were set using another multi-media disc; responsive to determining that one or more application settings files reside in media player memory, accessing the one or more application settings files; setting one or more application settings to values indicated by the one or more application settings files; and operating the media player according to the one or more application settings.

Another aspect provides a computer program product for managing application settings across titles comprising: a computer readable storage medium having computer readable program code embodied therewith, the computer readable program code comprising: computer readable program code configured to, responsive to input of a multi-media disc to an optical drive of a media player, ascertain if one or more application settings files reside in media player memory, the one or more application settings files storing one or more preferred default values for one or more applications that were set using another multi-media disc; computer readable program code configured to, responsive to determining that one or more application settings files reside in media player memory, access the one or more application settings files; computer readable program code configured to set one or more application settings to values indicated by the one or more application settings files; and computer readable program code configured to operate the media player according to the one or more application settings.

A further aspect provides system for managing application settings across titles comprising: one or more processors; and a memory operatively connected to the one or more processors; wherein, responsive to execution of computer readable program code accessible to the one or more processors, the one or more processors are configured to: responsive to input of a multi-media disc to an optical drive of a media player, ascertain if one or more application settings files reside in media player memory, the one or more application settings files storing one or more preferred default values for one or more applications that were set using another multi-media disc; responsive to determining that one or more application settings files reside in media player memory, access the one or more application settings files; set one or more application settings to values indicated by the one or more application settings files; and operate according to the one or more application settings.

The foregoing is a summary. For a better understanding of example embodiments, together with other and further features and advantages thereof, reference is made to the following description, taken in conjunction with the accompanying drawings, and the scope of the invention will be pointed out in the appended claims.

DETAILED DESCRIPTION

Figure 1:
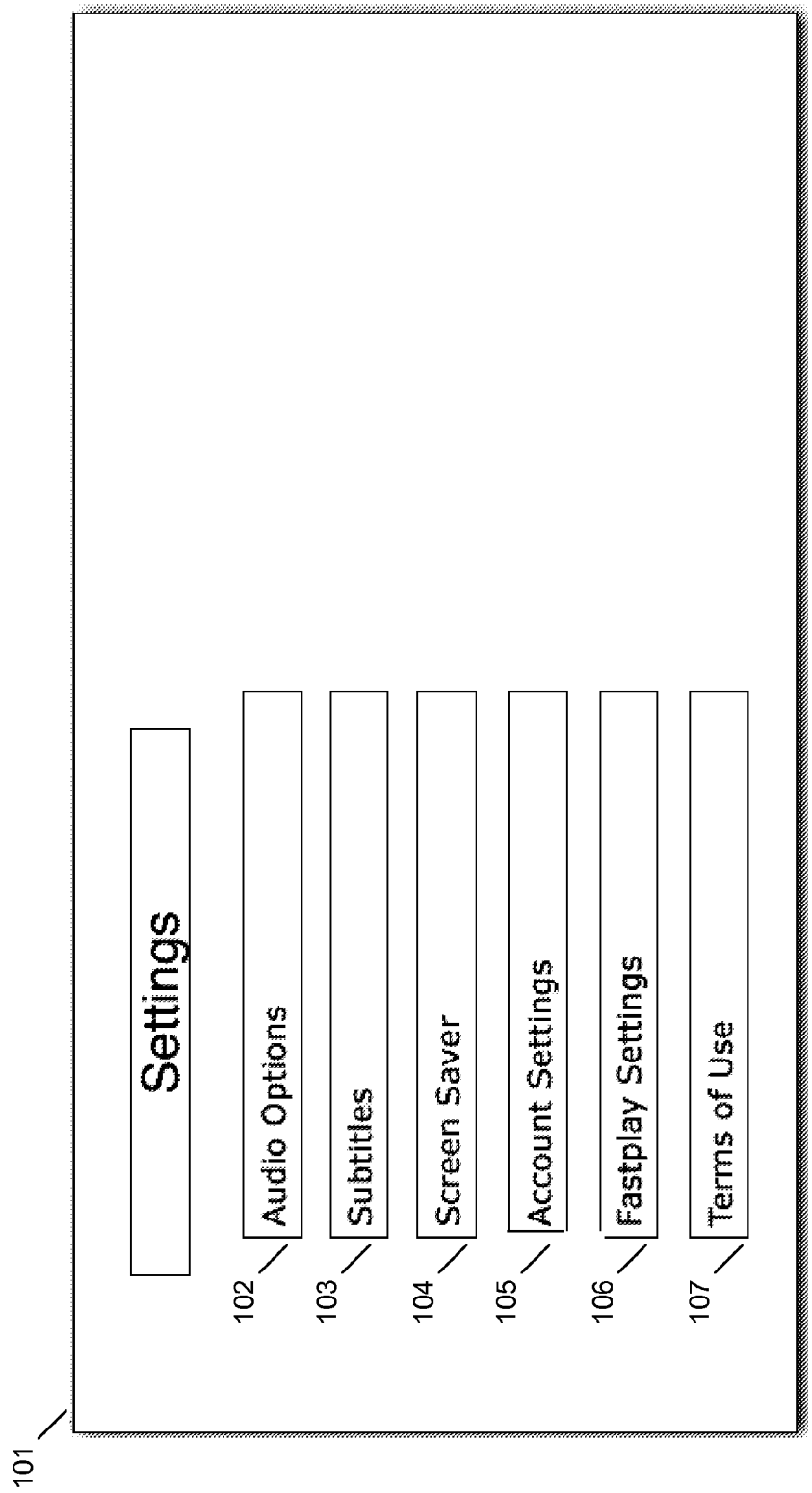
FIG. 1 illustrates an example settings menu.

Components of the embodiments, as generally described and illustrated in the figures herein, may be arranged and designed in a wide variety of different configurations in addition to the described example embodiments. Thus, the following more detailed description of example embodiments, as represented in the figures, is not intended to limit the scope of the invention, as claimed, but is merely representative of example embodiments. Furthermore, the described features, structures, or characteristics may be combined in any suitable manner in one or more embodiments. In the following description, numerous specific details are provided to give a thorough understanding of embodiments.

Reference throughout this specification to embodiment(s) means that a particular feature, structure, or characteristic described in connection with the embodiment is included in at least one embodiment. Thus, appearances of the phrases "certain embodiments" or "example embodiment" or the like in various places throughout this specification are not necessarily all referring to the same embodiment.

In this regard, specific examples of media players, multi-media discs, applications, and settings therefor are described herein; however these are intended only as non-limiting examples, as the general principles described herein can be applied to a variety of media players, multi-media discs, application types, and settings, even if not specifically described. Moreover, additional information on autoplay/fastplay applications is contained in co-pending and commonly assigned U.S. patent application Ser. No. 10/757,089, entitled "FAST PLAY DVD", filed on Jan. 13, 2004, and U.S.

patent application Ser. No. 12/895,025, entitled "SYSTEMS AND METHODS FOR DYNAMIC CONTENT PLAY LIST CREATION", filed concurrently herewith, both of which are incorporated by reference here.

At the outset, the following terms are given the following meanings herein. Application refers to a program module or executable program having computer readable program code configured to achieve a stated function. An option/setting refers to a given characteristic of an application, which may be chosen from among a variety of characteristics. An option/setting may include one or more sub-settings. A sub-setting refers to a configuration of an option/setting, which may be chosen from among a variety of configurations. Thus, an application includes for example a language application. Options/settings of the example language application include for example characteristics such as an English option/setting and a French option/setting. Sub-settings for the example English option/setting include for example an English 7.1 audio sub-setting or an English 2.0 sub-setting.

The description now turns to the figures. The illustrated example embodiments will be best understood by reference to the figures. The following description is intended only by way of example and simply illustrates certain embodiments representative of the invention, as claimed.

FIG. 1 illustrates a settings menu 101. The settings menu is derived from an application, for example a JAVA application stored on the multi-media disc (also referred to herein as "disc") along with other content (for example, a movie, a documentary, bonus features, et cetera), loaded by the media player. The settings application provides a variety of options available on the disc and the settings menu 101 is the interface through which the user can manage options/settings for an application.

In DVD, a technology referred to as fastplay (also referred to herein as autoplay) gives a DVD consumer the ability to view a set of content (play list) on the disc in a fashion similar to viewing content on VHS, that is, linearly. Moreover, in DVD, fastplay can be utilized automatically, without having to interface with a menu. Currently, using fastplay, the content is not extensively customizable, as the content is presented to consumers without permitting the user to modify fastplay content, for example based on available time and/or content preference. For example, if the user does not want to experience a particular offering in a fastplay application play list, the user is forced to view the particular offering regardless of his or her preference. Moreover, once a user inputs his or her preferences, it would be desirable for these preferences to be retained and applied across titles.

Accordingly, embodiments provide systems and associated methods configured for dynamic content play list creation. The dynamic content play list creation is described in connection with a fastplay application for BLU-RAY DISCs; however, this is by no means limiting, as other media storage devices/discs can be utilized using the general principles described herein.

Embodiments utilize categorization and local media player storage to present a set of custom play list(s) that are tailored to a user's choices and/or available time. The settings associated with the play list thus created are stored locally on the media player storage device (also referred to herein as a hard drive or a binding unit) such that the preferences can be utilized across all titles enabled with settings management technology. Dynamic content play list creation allows the user to customize the viewing experience by offering a user interface to set available time and content preferences.

On load of a first disc into a media player, the media player loads the settings management application and presents the settings menu 101 such that the user may choose from a variety of options/settings provided with the disc. Options/settings may be provided for a variety of applications, such as audio or language applications, subtitle applications, screen saver applications, account management applications, fastplay applications, et cetera.

A fastplay application includes a method of, upon not receiving an input within a pre-determined time interval from the user selecting the plurality of data blocks of the medium to be viewed, automatically playing the plurality of data blocks of the medium in a pre-determined sequence. For example, embodiments may utilize categorization and local media player storage to present a set of custom play list(s) that are tailored to a user's choices and/or available time. The settings associated with the play list thus created are stored locally on the media player storage device (also referred to herein as a hard drive or a binding unit) such that the preferences can be utilized across all titles enabled with settings management technology. Dynamic content play list creation allows the user to customize the viewing experience by offering a user interface to set available time and content preferences.

The different options are provided by one or more applications, typically resident on the multi-media disc. For example, an audio or language application provides language options such that the user may select among various audio and subtitle options to be played by the media player. Thus, the applications may be stored on the multi-media disc itself and presented to the user via a user interface (menu). However, applications or parts thereof may be stored in a variety of locations, including locally in the media player storage device or on a remote device operatively connected to the media player via a network such as the Internet.

Contrary to prior approaches and as described further herein, embodiments permit user selections to be stored locally to the media player storage device such that the selection can be retrieved the next time a user inserts any disc (even another title) that supports a settings management application, as described further herein. Within a multi-disc session, this set of saved preferences may also be retained in application memory. Moreover, any disc that is inserted can be used to update the settings information (write to the settings file(s)). Embodiments thus provide a settings management application that saves settings into one or more files, preferably on the binding unit of the media player.

The settings menu 101 lists a variety of applications (102-107). The settings management application permits the user to select among various applications and define his or her preferred settings for those applications. The settings menu 101 thus consists of a set of saved session information based on configurable options. According to embodiments, preferences for options set in the settings menu 101 are saved to a local file on the media player storage device (referred to herein as a hard drive, a system memory or a binding unit) by the settings management application. These stored preferences are accessible by all discs that implement a settings management application, as described herein. As with other applications, the settings management application may itself be stored in a variety of areas, including but not limited to on a media player storage device and/or on a multi-media disc, such as a BLU-RAY DISC, containing other title media content. Moreover, the settings management application can be stored in part on the multi-media disc and in part on the media player storage device and/or a remote storage device.

The settings menu 101 is displayed on a display screen, such as an HD television operatively connected to the media player, when the user loads the disc into the media player and selects a settings option, as for example via remote control of the media player. On the settings menu 101 the user can scroll through the applications (102-107) listed in order to highlight and select an appropriate choice.

Certain applications (for example, audio and subtitle) may have varying options depending on the currently inserted disc and stock-keeping unit (SKU). For example, the audio options and the subtitle options set or inform the currently selected preferred default language for the audio stream or the subtitle stream. Each disc has a single set of available languages for audio and subtitle stream options/settings, and each disc has a default language based on the setting selected from the main disc version menu (DVM). When viewing language options, this particular list is typically presented to the user via a menu such that a selection can be made. This available list may vary between discs. For example, a first title may support both English and French audio options, while a second title may only support an English audio option. The settings management application intelligently manages a user's preferred settings across titles.

Figure 2:
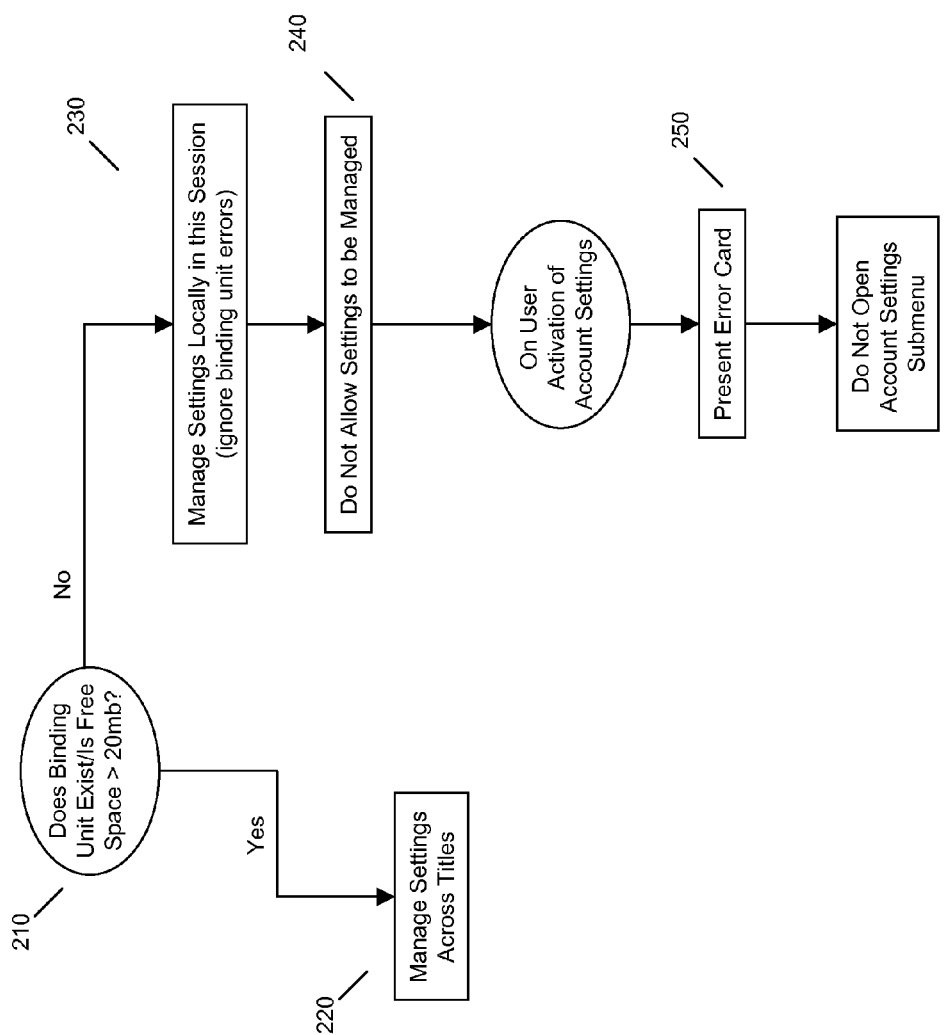
FIG. 2 illustrates an example of initial access of a settings management application.

Referring to FIG. 2, responsive to load or insert of a new title (disc), the settings management application checks 210 the binding unit to ascertain if existing storage space is available for saving of application settings. If there is sufficient storage space, a manage settings option will be enabled 220 and the settings management application will operate as described herein. However, if sufficient storage space does not exist, as a non-limiting example at least 20 MB, settings will be managed locally 230, on a session-by-session basis (per title entry). If settings are to be managed locally 230, the manage settings option will not be enabled 240 and on user attempt to activate the settings management application, an error card will be displayed and the account settings sub-menu can be disabled 250.

Figure 3:
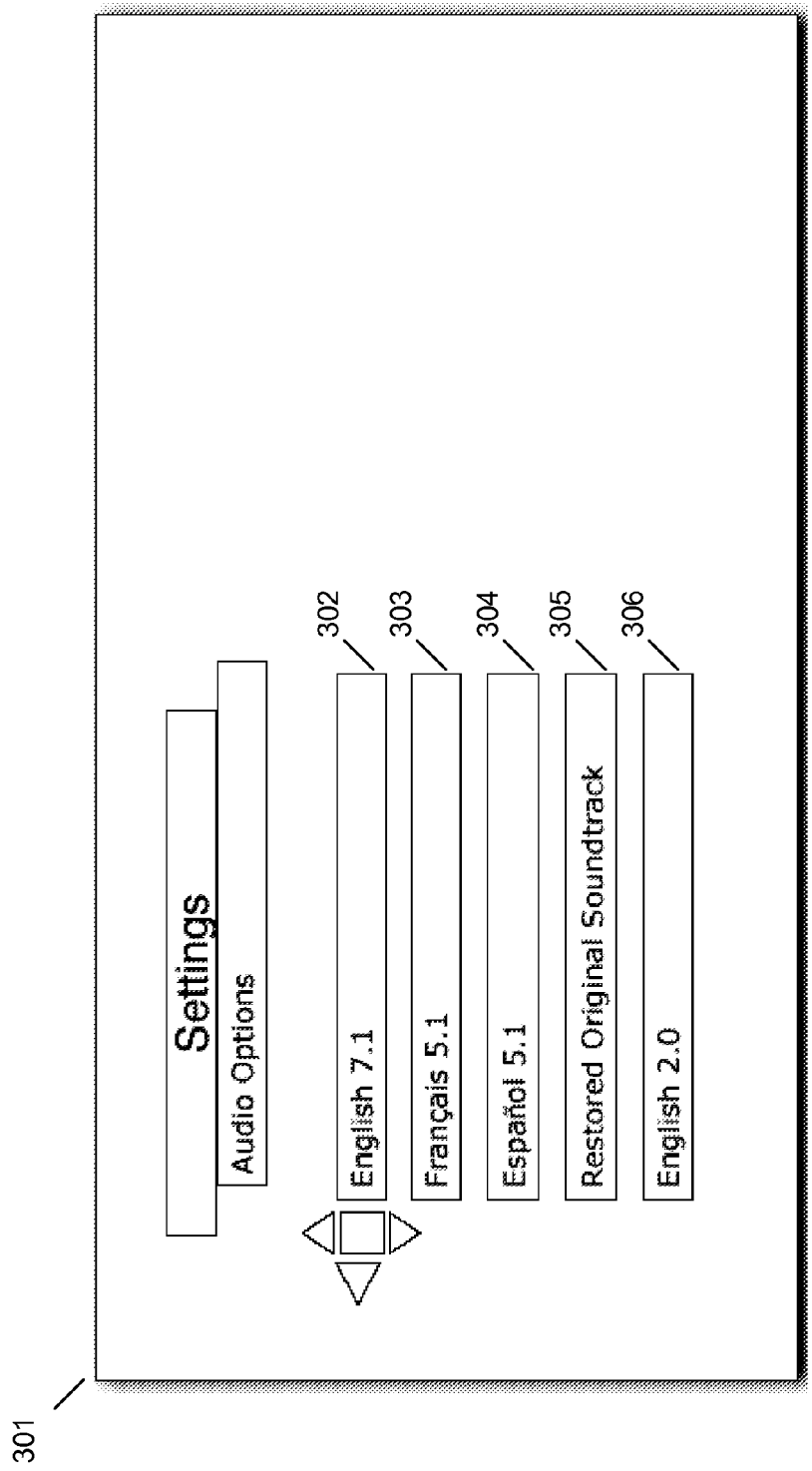
FIG. 3 illustrates an example of an audio options sub-menu.

Referring to FIG. 3, the example illustrates an audio options setting sub-menu 301 listing a variety of settings (302-306). The audio options setting sub-menu 301 is displayed responsive to a user selection of audio options 105 on the settings menu 101. The example illustrates the highlight and selection of English 7.1 (302) as the audio option sub-setting preferred by this user. Thus, the user wishes the media stored on the disc to be played back using an English 7.1 sub-setting. Embodiments store this selection as a preferred audio option file such that it can be retrieved automatically the next time the user inserts a disc.

Figure 4:
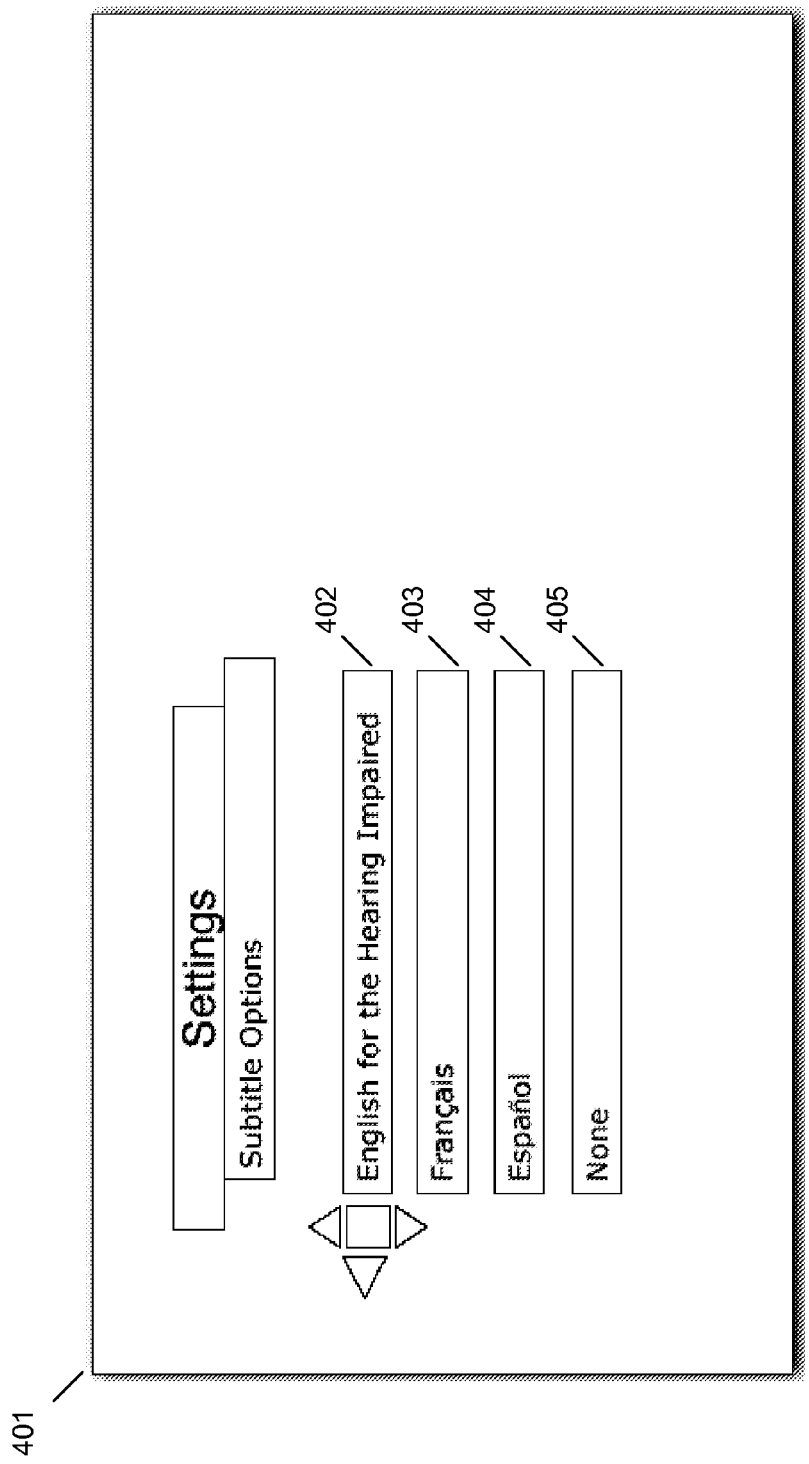
FIG. 4 illustrates an example of a subtitles sub-menu.

Referring to FIG. 4, the example illustrates subtitles setting sub-menu 401 listing a variety of settings (402-405). The subtitles setting sub-menu 401 is displayed responsive to a user selection of subtitles option 103 on the settings menu 101. The example illustrates the highlight and selection of English for the hearing impaired (402) as the subtitles sub-setting preferred by this user. Thus, the user wishes the audio media stored on the disc to be played back along with English subtitles for the hearing impaired. Embodiments again store this selection as a preferred subtitles option file such that it can be retrieved automatically the next time the user inserts a disc.

Figure 5A:
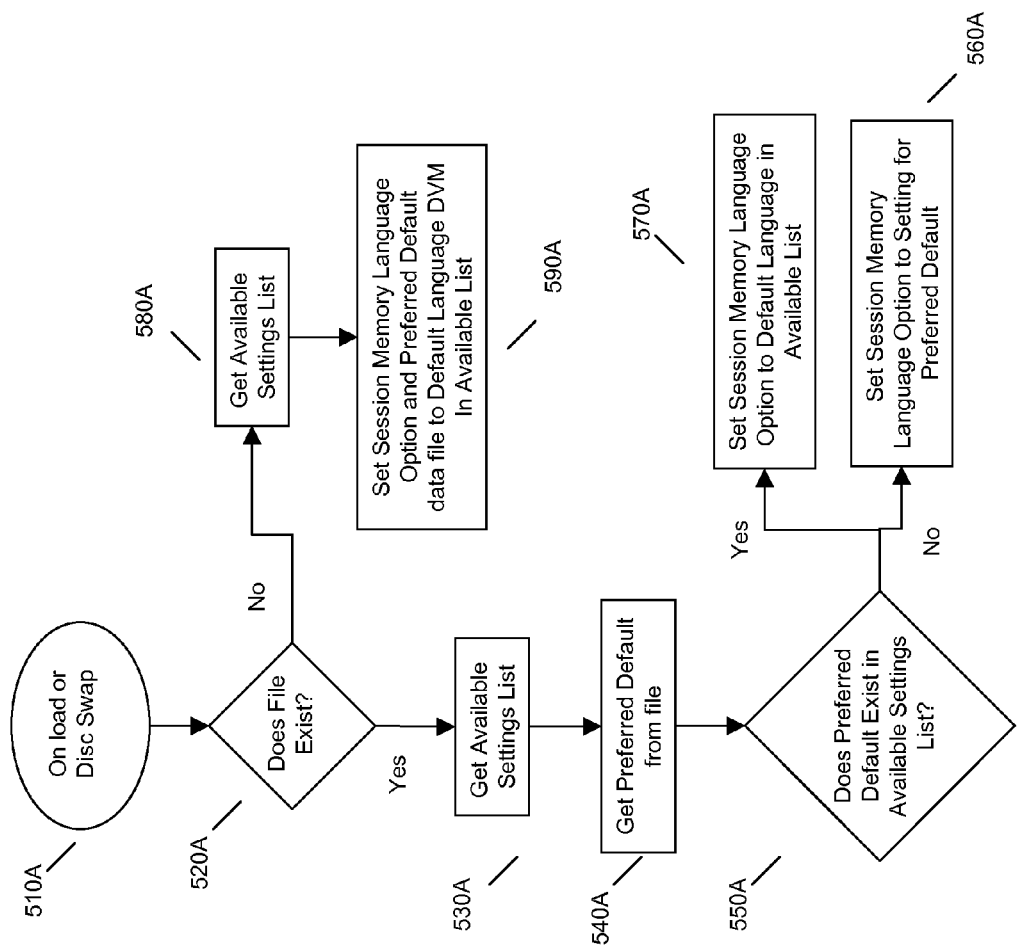
FIG. 5(A-D) illustrates examples of managing application settings across titles.

Referring to FIG. 5A, an example method for settings management is illustrated. The example described in connection with FIG. 5A is for an audio option; however this is merely a non-limiting example of application settings management. On a load of a new disc or a disc swap 510A, the settings management application checks if an audio file exists in media player storage indicating a preferred default 520A. The audio file saves the preferred language settings from a previous session. If the audio file exists, the available settings for the particular title of the disc are retrieved 530A. Likewise, the preferred default audio setting is retrieved 540A. The settings management application determines if the preferred default indicated in the audio file exists in the available list of settings for the disc 550A. If so, the session memory language option is set to the preferred default (for example, English) for the session 560A. If not, the session memory language option is set to the default for the disc as indicated in the title's available list 570A.

If the audio file does not exist (that is, there has been no preference for the audio setting of language saved from a prior session), the settings management application gets the available settings list from the disc 580A. The session memory is set to the language option default for the disc and this setting is saved as the preferred default in an audio file for use in the next session 590A.

Figure 5B:
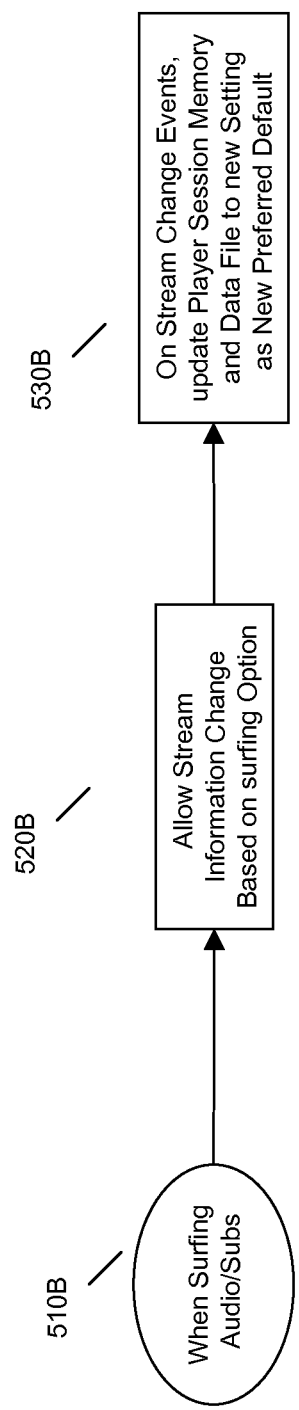

Referring to FIG. 5B, an example of changing application settings is illustrated. When a user is surfing application settings, in this example, audio settings, for example from a feature or featurette of the disc 510B, the settings management application permits the stream information to change based on the option chosen 520B. On a stream change, the settings management application updates the session memory and the data file for the application (in this example, the audio file storing the preferred setting) to the new setting as the user makes the new selection. Thus, if a user is watching a feature in English and decides to switch the language setting to French, the settings management application permits this change such that the user is enabled to watch the feature in French (assuming the disc supports this language option). Moreover, the settings management application stores the new language setting (French) as a new preferred default setting in the audio file (replacing English).

Figure 5C:
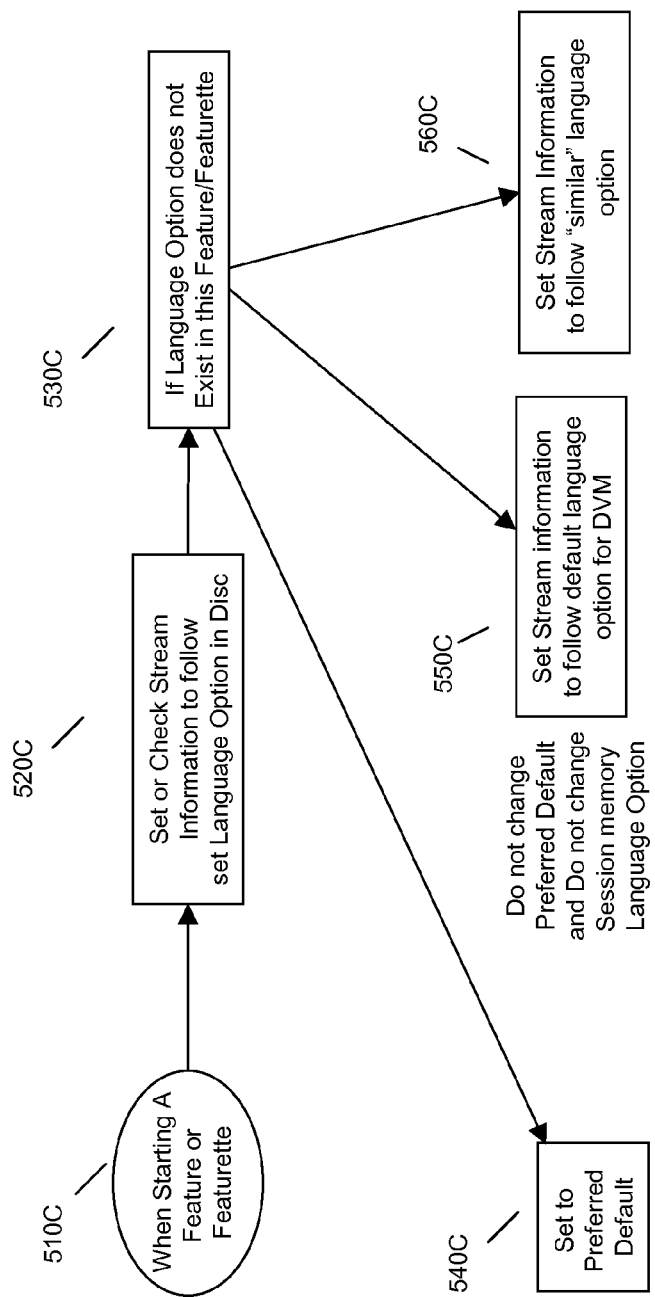

Referring to FIG. 5C, an example of changing application settings is illustrated. If a preferred default setting exists for a given option, when starting a viewing session, such as for example when starting a feature or featurette 510C, the language is set to follow this preferred default 520C. The settings management application checks to determine if an application settings option exists (that is, is supported by the options provided by the disc) corresponding to the stored preferred default 530C. For example, the settings management application checks to determine if a language option stored as the preferred default is available given the particular title or part thereof being viewed. If so, the settings management application sets the stream information to follow the preferred default language option saved in the audio file automatically 540C.

If the option does not exist in the available list for the title, the stream can be set to follow the default option of the disc 550C or a "similar" language to the preferred default 560C. For example, if the user has previously selected as a preferred language sub-setting a Spanish dialect (for example, European/Peninsular Spanish) but the disc only supports another sub-setting dialect (for example, Spanish of the Americas), the settings management application can implement the "similar" language sub-setting to approximate the preferred sub-setting. This can be accomplished for example by providing a predetermined mapping function or logic indicating settings/sub-settings that are predefined as similar.

Figure 5D:
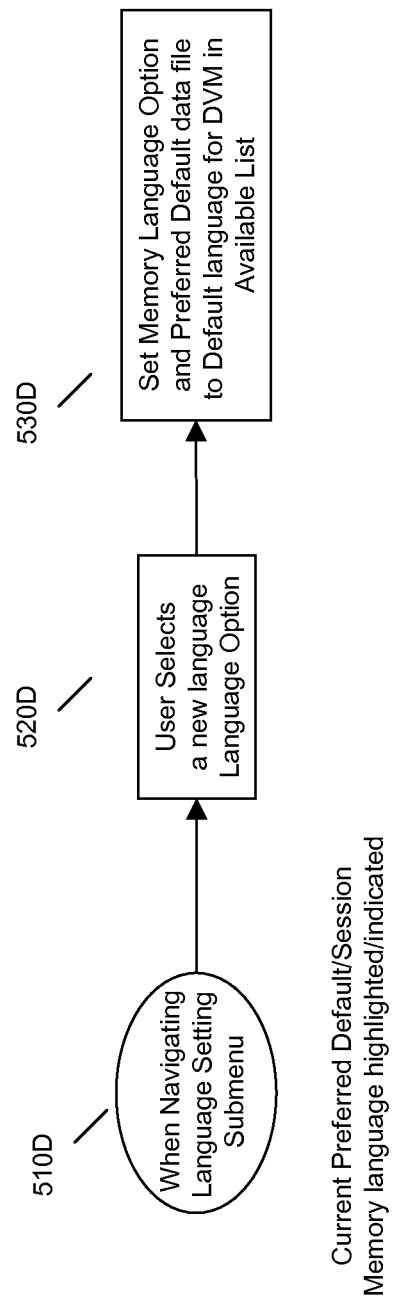

Referring to FIG. 5D, an example of setting a preferred default is illustrated. When navigating a setting sub-menu 510D, for example audio options setting sub-menu 301, a user may select a new language option 520D. For example, the user may select to have media from the disc played back in English as opposed to French. The settings management application sets the session memory language option and stores the selection as the preferred default to a binding unit file 530D.

Figure 6:
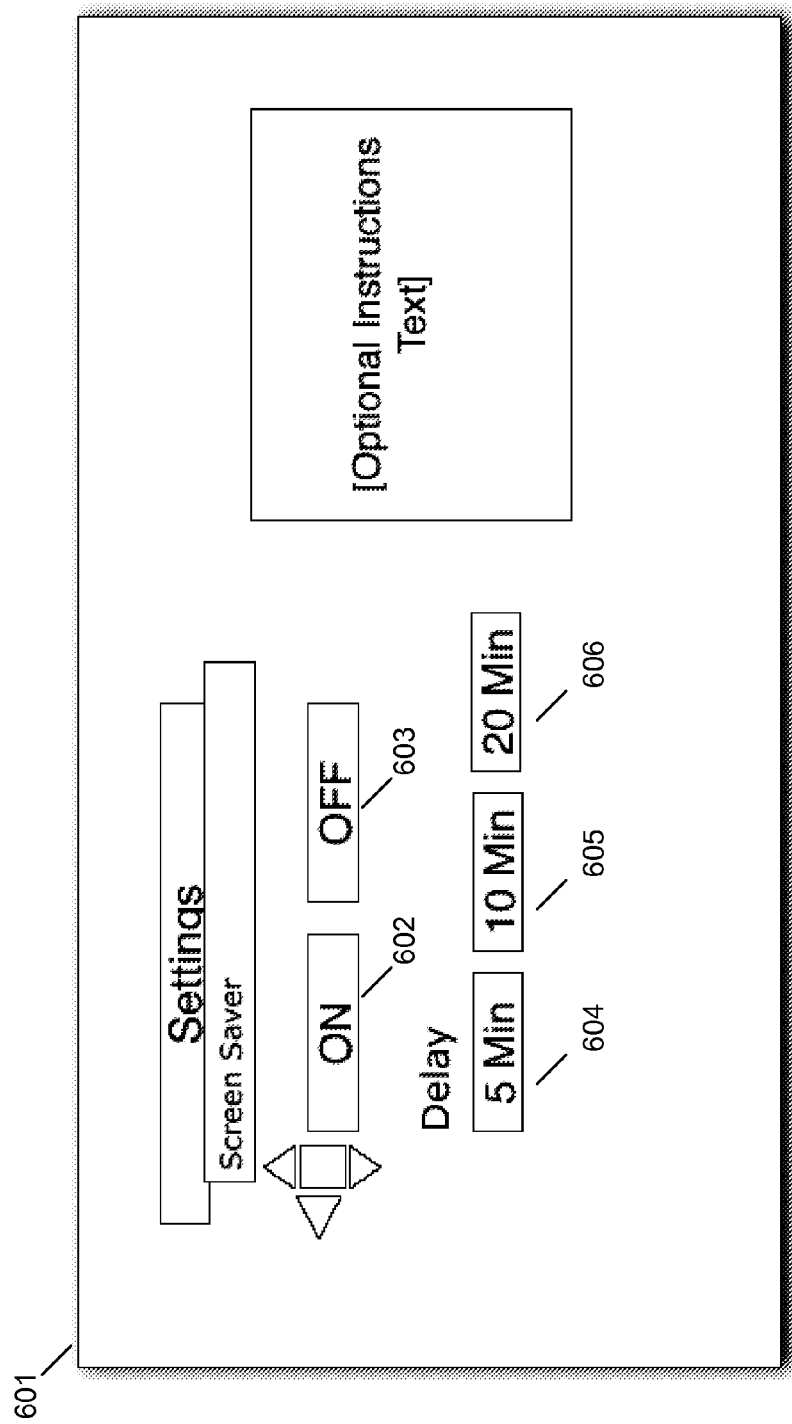
FIG. 6 illustrates an example of a screen saver sub-menu.

Referring to FIG. 6, the example illustrates screen saver setting sub-menu 601 listing settings (602-606). The screen saver is an automated utility that when enabled affects the opacity of the screen, for example the menu screen. The screen saver setting sub-menu 601 provides options 602, 603 for enabling/disabling the screen saver utility and a variety of timer sub-settings 604-606. If the screen saver utility is enabled, the screen saver application keeps a timer running that tracks how long it has been since the user has made a selection. If the timer passes beyond a predetermined delay, the screen saver activates. Activating the screen saver causes the interface to dissolve away and the menu loop remains on screen with a slightly dimmed black overlay on the screen. The screen saver setting/sub-setting chosen by the user may be stored locally on the media player in the binding unit by the settings management application and is made available to all titles, similar to other application settings/sub-settings.

Figure 7:
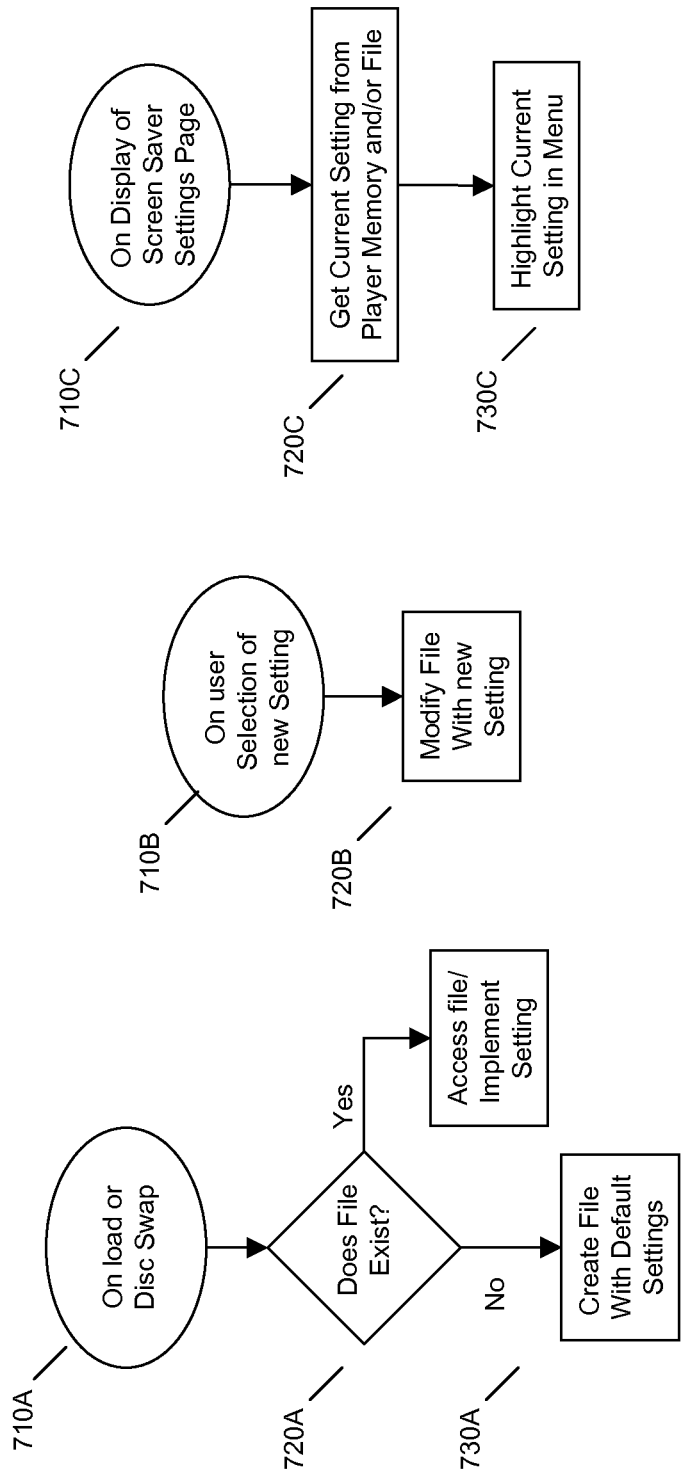
FIG. 7(A-C) illustrates examples of managing screen saver settings.

Referring to FIG. 7A-C, management of the screen saver settings/sub-settings is illustrated. In FIG. 7A, on insertion of a new disc or disc swap 710A, the settings management application checks to determine if a file exists for managing the screen saver 720A. If so, the file is accessed and the screen saver setting last used is implemented 730A. However, if no file yet exists, a file is created for the screen saver settings by implementing a predetermined default setting.

When a user selects a new setting for the screen saver via the screen saver sub-menu 710B, the settings management application modifies the existing screen saver settings file stored in the binding unit to update it with the new screen saver setting 720B. On next display of the screen saver sub-menu 710C, the settings management application retrieves the current screen saver settings from memory 720C and highlights the corresponding sub-menu selection 730C.

Figure 8:
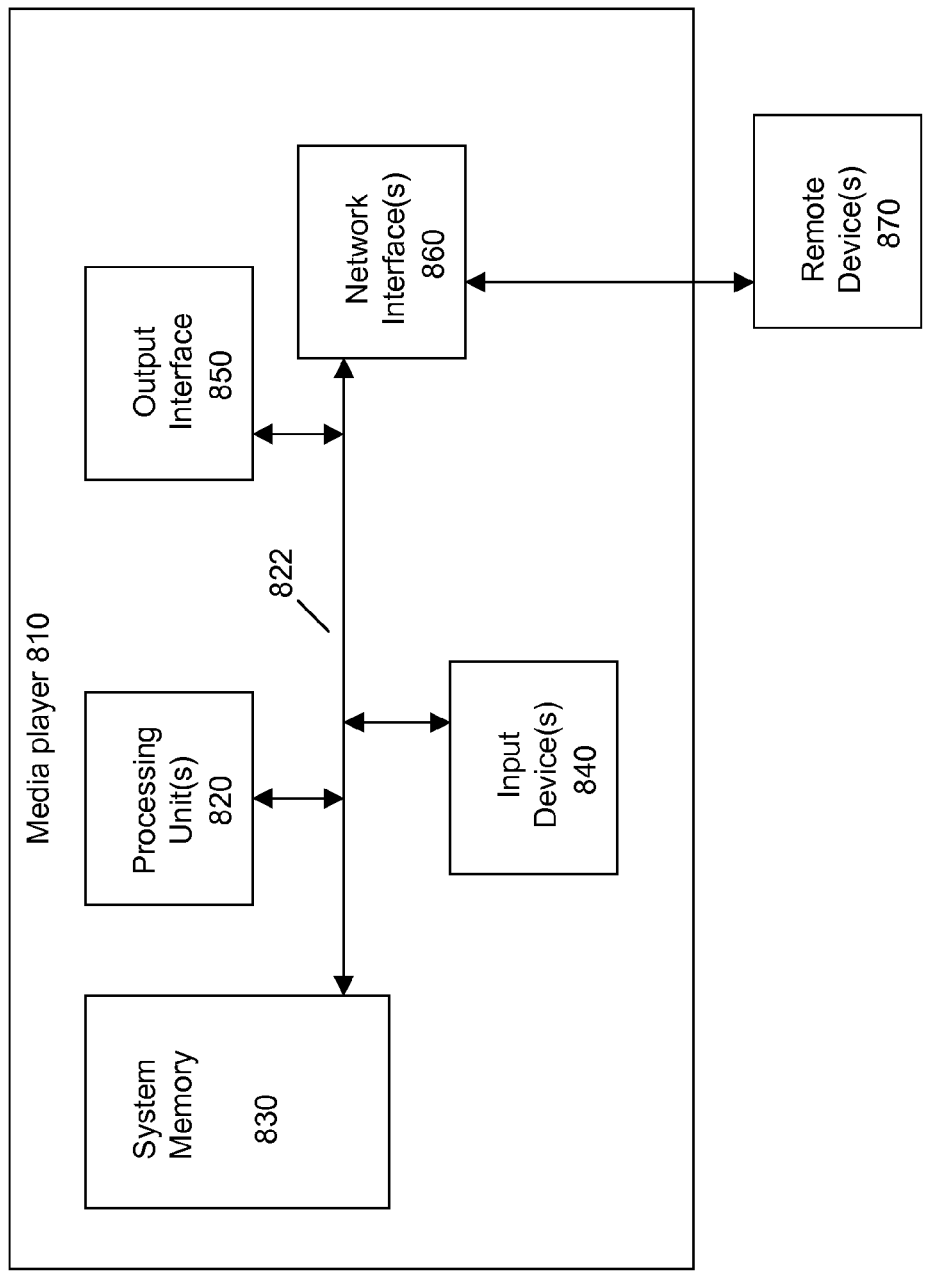
FIG. 8 illustrates an example computer.

Referring to FIG. 8, it will be readily understood that embodiments can be implemented using any of a wide variety of devices or combinations of devices. An example device that may be used in implementing one or more embodiments includes a computing device in the form of a media player 810, such as a BLU-RAY DISC player. In this regard, the media player 810 may execute program instructions configured to manage application settings and perform other functionality of the embodiments, as described herein.

Components of media player 810 may include, but are not limited to, processing units 820, a system memory 830, and a system bus 822 that couples various system components including the system memory 830 to the processing unit 820. Media player 810 may include or have access to a variety of computer readable media. The system memory 830 may include computer readable storage media in the form of volatile and/or nonvolatile memory such as read only memory (ROM) and/or random access memory (RAM). By way of example, and not limitation, system memory 830 may also include an operating system, application programs, other program modules, and program data.

A user can interface with (for example, enter commands and information) the media player 810 through input devices 840, which can include remote input devices. A monitor, HD television set, or other type of display device can also be connected to the system bus 822 via an interface, such as an output interface 850. In addition to a monitor, media players may also include other peripheral output devices. The media player 810 may operate in a networked or distributed environment using logical connections to one or more other remote computers or databases. The logical connections may include a network, such local area network (LAN) or a wide area network (WAN), but may also include other networks/buses.

It should be noted as well that embodiments may be implemented as a system, method or computer program product. Accordingly, aspects of the invention may take the form of an entirely hardware embodiment, an entirely software embodiment (including firmware, resident software, micro-code, et cetera) or an embodiment combining software and hardware aspects. Furthermore, aspects of the invention may take the form of a computer program product embodied in one or more computer readable medium(s) having computer readable program code embodied therewith.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative embodiments have been described herein with reference to the accompanying drawings, it is to be understood that the embodiments are not limited to those precise embodiments, and that various other changes and modifications may be affected therein by one skilled in the art without departing from the scope or spirit of the disclosure.

What is claimed is:

1. A method for managing application settings across titles comprising:
responsive to input of a multi-media disc to an optical drive of a media player, ascertaining if one or more application settings files reside in media player memory, the one or more application settings files storing one or more preferred default values for content playback that were set using another multi-media disc having different content than the input multi-media disc;
responsive to determining that one or more application settings files reside in media player memory, accessing the one or more application settings files;
setting one or more application settings to the one or more preferred default values indicated by the one or more application settings files, the one or more preferred default values indicating content playback preferences indicated in association with the another multi-media disc having different content than the input multi-media disc; and
after not receiving user input within a pre-determined time, operating the media player according to the one or more application settings;

wherein the one or more application settings generate a play list for automatically playing a plurality of data blocks of the input multi-media disc in a pre-determined sequence according to the content playback preferences indicated in association with the another multi-media disc having different content than the input multi-media disc.

2. The method according to claim 1, further comprising responsive to determining that insufficient media player memory is available for managing application settings, displaying an error message.

3. The method according to claim 1, further comprising responsive to determining that one or more application settings files do not reside in memory, setting application settings to default values indicated by the multi-media disc.

4. The method according to claim 1, further comprising receiving a user input changing a customizable fastplay setting;
changing the playlist and the predetermined sequence according to the user input; and
saving an updated customizable fastplay setting value.

5. The method according to claim 1, wherein the one or more media player applications comprise one or more of audio, subtitles, screen saver, and account settings.

6. The method according to claim 1, further comprising retrieving available application settings from the multi-media disc.

7. The method according to claim 6, further comprising responsive to determining that the one or more preferred default values indicated by the one or more application settings files are not compatible with the available application settings, setting application settings to similar values compatible to with the available application settings.

8. The method according to claim 1, wherein:
the multi-media disc comprises a multi-media disc of a first title; and
the another multi-media disc comprises a multi-media disc of a second title.

9. The method according to claim 8, further comprising determining if the one or more preferred default values indicated by the one or more application settings files are compatible with the available application settings.

10. The method according to claim 9, further comprising responsive to determining that the one or more preferred default values indicated by the one or more application settings files are not compatible with the available application settings, setting application settings to default values indicated by the multi-media disc.

11. A computer program product for managing application settings across titles comprising:
a non-transitory computer readable storage medium having computer readable program code embodied therewith, the computer readable program code being executable by a processor and comprising:
computer readable program code configured to, responsive to input of a multi-media disc to an optical drive of a media player, ascertain if one or more application settings files reside in media player memory, the one or more application settings files storing one or more preferred default values for content playback that were set using another multi-media disc having different content than the input multi-media disc;
computer readable program code configured to, responsive to determining that one or more application settings files reside in media player memory, access the one or more application settings files;
computer readable program code configured to set one or more application settings to the one or more preferred default values indicated by the one or more application settings files, the one or more preferred default values indicating content playback preferences indicated in association with the another multi-media disc having different content than the input multi-media disc; and
computer readable program code configured to, after not receiving user input within a pre-determined time, operate the media player according to the one or more application settings;
wherein the one or more application settings generate a play list for automatically playing a plurality of data blocks of the input multi-media disc in a pre-determined sequence according to the content playback preferences indicated in association with the another multi-media disc having different content than the input multi-media disc.

12. The computer program product according to claim 11, wherein:
the multi-media disc comprises a multi-media disc of a first title; and
the another multi-media disc comprises a multi-media disc of a second title.

13. The computer program product according to claim 11, further comprising:
computer readable program code configured to, responsive to determining that insufficient memory is available for managing application settings, display an error message; and
computer readable program code configured to, responsive to determining that one or more application settings files do not reside in memory, set application settings to default values indicated by the multi-media disc.

14. The computer program product according to claim 11, further comprising computer readable program code configured to:
receive a user input changing a customizable fastplay setting;
change the playlist and the predetermined sequence according to the user input; and
save an updated customizable fastplay setting value.

15. The computer program product according to claim 11, wherein the one or more media player applications comprise one or more of audio, subtitles, screen saver, and account settings.

16. The method according to claim 11, further comprising computer readable program code configured to retrieve available application settings from the multi-media disc.

17. The method according to claim 16, further comprising computer readable program code configured to determine if the one or more preferred default values indicated by the one or more application settings files are compatible with the available application settings.

18. The method according to claim 17, further comprising computer readable program code configured to, responsive to determining that the one or more preferred default values indicated by the one or more application settings files are not compatible with the available application settings, setting application settings to default values indicated by the multi-media disc.

19. The computer program product according to claim 17, further comprising computer readable program code configured to, responsive to determining that the one or more preferred default values indicated by the one or more application settings files are not compatible with the available application settings, set application settings to similar values compatible to with the multi-media disc.

20. A system for managing application settings across titles comprising:
one or more processors; and
a memory operatively connected to the one or more processors;
wherein, responsive to execution of computer readable program code accessible to the one or more processors, the one or more processors are configured to:
responsive to input of a multi-media disc to an optical drive of a media player, ascertain if one or more application settings files reside in media player memory, the one or more application settings files storing one or more preferred default values for content playback that were set using another multi-media disc having different content than the input multi-media disc;
responsive to determining that one or more application settings files reside in memory, access the one or more application settings files;
set one or more application settings to the one or more preferred default values indicated by the one or more application settings files, the one or more preferred default values indicating content playback preferences indicated in association with the another multi-media disc having different content than the input multi-media disc; and
after not receiving user input within a pre-determined time, operate according to the one or more application settings;
wherein the one or more application settings generate a play list for automatically playing a plurality of data blocks of the input multi-media disc in a pre-determined sequence according to the content playback preferences indicated in association with the another multi-media disc having different content than the input multi-media disc.

* * * * *